(12) United States Patent
Yeh et al.

(10) Patent No.: US 10,373,548 B2
(45) Date of Patent: Aug. 6, 2019

(54) PIXEL STRUCTURE AND DRIVING METHOD

(71) Applicant: E Ink Holdings Inc., Hsinchu (TW)

(72) Inventors: Chia-Chun Yeh, Hsinchu (TW); Kuo-Hsing Cheng, Hsinchu (TW); Kuo-Yen Chang, Hsinchu (TW); Hsing-Yi Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 126 days.

(21) Appl. No.: 15/709,487

(22) Filed: Sep. 20, 2017

(65) Prior Publication Data

US 2018/0137802 A1 May 17, 2018

(30) Foreign Application Priority Data

Nov. 17, 2016 (CN) .......................... 2016 1 1032722

(51) Int. Cl.
*G09G 3/20* (2006.01)
*G06F 1/16* (2006.01)

(52) U.S. Cl.
CPC ............ G09G 3/2092 (2013.01); G06F 1/163 (2013.01); *G09G 2300/0426* (2013.01); *G09G 2300/0439* (2013.01); *G09G 2300/0842* (2013.01); *G09G 2310/0297* (2013.01); *G09G 2310/08* (2013.01)

(58) Field of Classification Search
CPC ......... G09G 2300/0439; G09G 3/2092; G09G 2310/0297; G09G 2300/0426; G09G 2310/08; G06F 1/163
See application file for complete search history.

(56) References Cited

U.S. PATENT DOCUMENTS

| | | |
|---|---|---|
| 2002/0054003 A1 | 5/2002 | Kodate |
| 2003/0189559 A1 | 10/2003 | Lee et al. |
| 2011/0156993 A1* | 6/2011 | Ting ................. G02F 1/133707 345/87 |
| 2013/0076600 A1 | 3/2013 | Park |
| 2014/0054624 A1 | 2/2014 | Chen et al. |
| 2014/0264357 A1 | 9/2014 | Chen et al. |

(Continued)

FOREIGN PATENT DOCUMENTS

| | | |
|---|---|---|
| TW | 200727230 A | 7/2007 |
| TW | 201137481 A | 11/2011 |

(Continued)

OTHER PUBLICATIONS

Corresponding Taiwanese Notice of Allowance dated Sep. 28, 2017.

*Primary Examiner* — Lixi C Simpson
(74) *Attorney, Agent, or Firm* — CKC & Partners Co., LLC

(57) ABSTRACT

A pixel structure includes data lines disposed along a first direction, scan lines disposed along a second direction and pixel units periodically disposed along the first and the second directions. In a first pixel unit, a first switch element is coupled to a first scan line and a first data line, the second switch element is coupled to the first scan line, and a third switch element is coupled to the first scan line. In a second pixel unit, a fourth switch element is coupled to a second scan line, the first data line and the second switch element, and a fifth switch element is electrically coupled to the second scan line and the third switch element. In a third pixel unit, a sixth switch element is coupled to a third scan line, the first data line and the fifth switch element.

10 Claims, 2 Drawing Sheets

(56) References Cited

U.S. PATENT DOCUMENTS

2015/0022507 A1* 1/2015 Yao .................. G09G 3/003
                                                                                                  345/206
2017/0092211 A1* 3/2017 Xu .................. G09G 3/3614

FOREIGN PATENT DOCUMENTS

| TW | 201225040 A | 6/2012 |
| TW | 201638919 A | 11/2016 |

* cited by examiner

PIXEL STRUCTURE AND DRIVING METHOD

RELATED APPLICATIONS

This application claims priority to Chinese Application Serial Number 201611032722.0, filed Nov. 17, 2016, which is herein incorporated by reference.

BACKGROUND

Technical Field

The present invention relates to a pixel structure and a driving method.

Description of Related Art

In a design of a wearable device (e.g., a smart watch, a smart bracelet), a number of wiring on a periphery portion of pixels is increased as an increased number of data lines, which results in a frame width of a packaged display is difficult to be reduced, and therefore difficult to be applied to a product with a slim frame design.

SUMMARY

An aspect of the present disclosure is to provide a pixel structure that includes a plurality of data lines, a plurality of scan lines and a plurality of pixel units. The data lines are disposed along a first direction, the scan lines are disposed along a second direction, and the first direction is different from the second direction. The pixel units are periodically disposed along the first direction and the second direction. A first pixel unit of the pixel units includes a first switch element, a second switch element and a third switch element. The first switch element is electrically coupled to a first scan line of the scan lines and a first data line of the data lines. The second switch element is electrically coupled to the first scan line. The third switch element is electrically coupled to the first scan line. The second pixel unit of the pixel units includes a fourth switch element and a fifth switch element. The fourth switch element is electrically coupled to a second scan line of the scan lines, the first data line and the second switch element. The fifth switch element is electrically coupled to the second scan line and the third switch element. A third pixel unit of the pixel units includes a sixth switch element. The sixth switch element is electrically coupled to a third scan line of the scan lines, the first data line and the fifth switch element.

Another aspect of the present disclosure is to provide a driving method adaptable to a pixel structure. The pixel structure includes a plurality of data lines, a plurality of scan lines and a plurality of pixel units. The data lines are disposed along a first direction, the scan lines are disposed along a second direction, and the first direction is different from the second direction. The pixel units are periodically disposed along the first direction and the second direction. A first pixel unit of the pixel units includes a first switch element, a second switch element and a third switch element. A second pixel unit of the pixel units includes a fourth switch element and a fifth switch element. A third pixel unit of the pixel units includes a sixth switch element. The driving method includes steps as follows. In a first time interval, an enable signal is transmitted by the first scan line, the second scan line and the third scan line. In the first time interval, a first data signal on a first data line of the data lines is received by a first switch element, the first data signal through the fourth switch element is received by a second switch element, and the first data signal through the fifth switch element and the sixth switch element is received by the third switch element.

In conclusion, the pixel structure of the present disclosure can drive three switch elements (i.e., driving three pixels) to receive and store the data signal of the same data line by time-division-multiplexed scan, therefore effectively reduce the number of the data line in the pixel structure, and further achieve an effect of the data lines without wiring on the periphery portion of the pixel structure. Moreover, the data selection line disposed between the pixel units can further reduce the number of the wiring on the periphery portion of the pixel structure. Therefore, the pixel structure of the present disclosure is adaptable to a display device with a slim frame design.

It is to be understood that both the foregoing general description and the following detailed description are by examples, and are intended to provide further explanation of the invention as claimed.

BRIEF DESCRIPTION OF THE DRAWINGS

The invention can be fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise indicated, all numbers expressing quantities, conditions, and the like in the instant disclosure and claims are to be understood as modified in all instances by the term "about." The term "about" refers, for example, to numerical values covering a range of plus or minus 20% of the numerical value. The term "about" preferably refers to numerical values covering range of plus or minus 10% (or most preferably, 5%) of the numerical value. The modifier "about" used in combination with a quantity is inclusive of the stated value.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
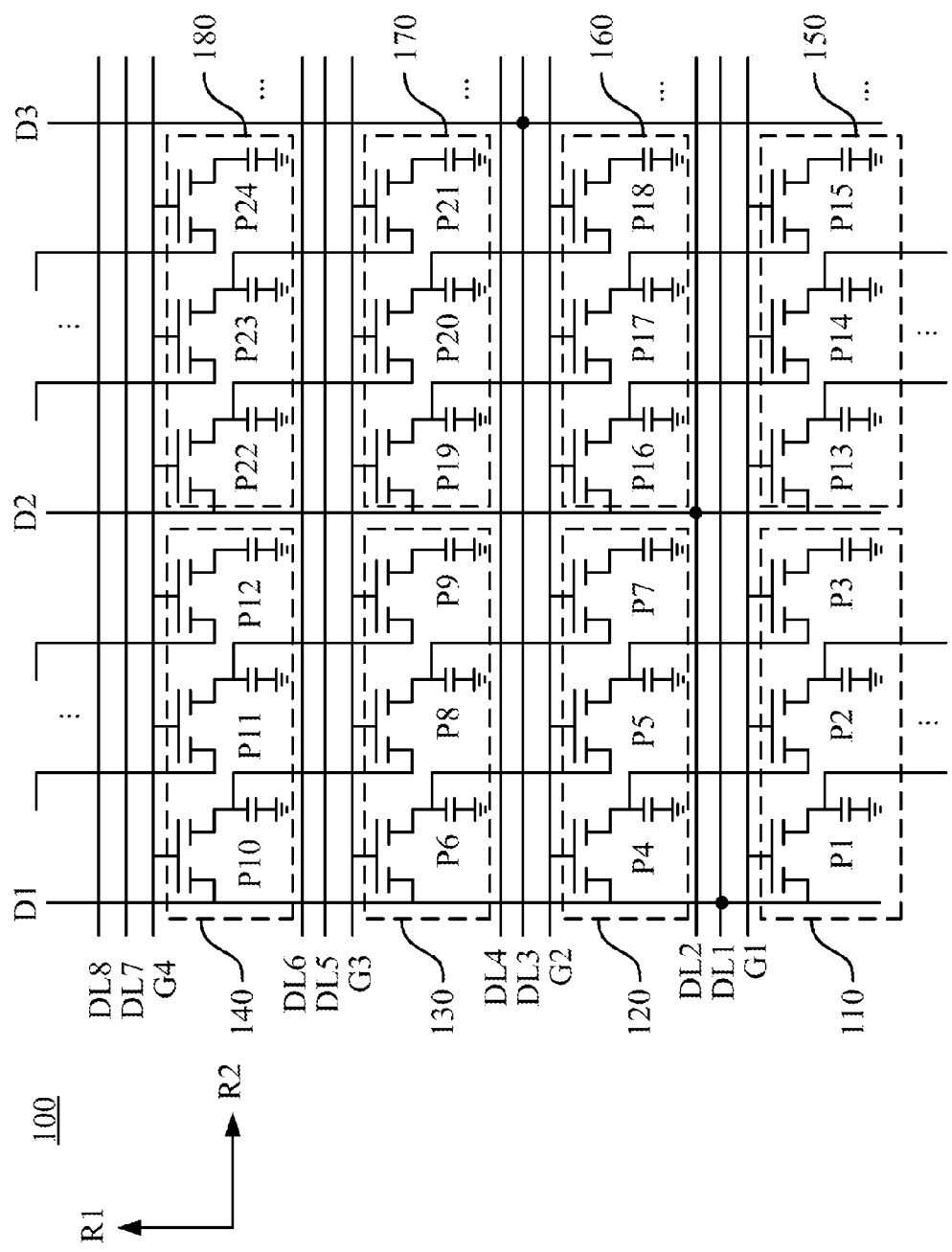
FIG. 1 is a schematic diagram of a pixel structure according to an embodiment of the present disclosure.

Reference is made to FIG. 1. FIG. 1 is a schematic diagram of a pixel structure 100 according to an embodiment of the present disclosure. The pixel structure 100 includes a plurality of data lines D1-D3, a plurality of scan lines G1-G4 and a plurality of pixel units 110-180. The data lines D1-D3 are disposed along a first direction R1, the scan lines G1-G4 are disposed along a second direction R2, and the pixel units 110-180 are periodically disposed along the first direction R1 and the second direction R2. The first direction R1 is different from the second direction R2. As shown in FIG. 1, the pixel unit 110 includes switch elements P1-P3. The switch element P1 is electrically coupled to the scan line G1 and the data line D1, the switch element P2 is electrically coupled to the scan line G1, and the switch element P3 is electrically coupled to the scan line G1. The pixel unit 120 includes switch elements P4 and P5. The switch element P4 is electrically coupled to the scan line G2, the data line D1 and the switch element P2, and the switch element P5 is electrically coupled to the scan line G2 and the switch element P3. The pixel unit 130 includes a switch element P6. The switch element P6 is electrically coupled to the scan line G3, the data line D1 and the switch element P5.

As shown in FIG. 1, the switch elements (e.g., transistors) P1-P3 of the pixel unit 110 and the switch elements P13-P15 of the pixel unit 150 are electrically coupled to the scan line G1 through control terminals thereof. The switch elements P4, P5 and P7 of the pixel unit 120 and the switch elements P16-P18 of the pixel unit 160 are electrically coupled to the scan line G2 through control terminals thereof. The switch elements P6, P8 and P9 of the pixel unit 130 and the switch elements P19-P21 of the pixel unit 170 are electrically coupled to the scan line G3 through control terminals thereof. The switch elements P10-P12 of the pixel unit 140 and the switch elements P22-P24 of the pixel unit 180 are electrically coupled to the scan line G4 through control terminals thereof. It should be described that the switch elements P1-P24 are corresponding to a pixel respectively, that is, each of the pixel units 110-180 includes three pixels. However, the present disclosure is not limited thereto. The pixel units 110-180 may also include another number of switch elements (or pixels).

It should be described that a first switch element (e.g., the switch elements P1, P4, P6, P10) in each of the pixel units 110-180 is electrically coupled to a data line (e.g., the data line D1) through a first terminal thereof, and electrically coupled to a capacitor through a second terminal thereof. A second switch element (e.g., the switch elements P2, P5, P8) in each of the pixel unit 110-180 is electrically coupled to the first switch element (e.g., the switch elements P4, P6, P10) in an adjacent pixel unit through a first terminal thereof, and electrically coupled to a capacitor through a second terminal thereof. A third switch element (e.g., the switch elements P3, P7, P9) in each of the pixel units 110-180 is electrically coupled to the second switch element (e.g., the switch elements P5, P8, P11) in the adjacent pixel unit through a first terminal thereof, and electrically coupled to a capacitor through a second terminal thereof. Therefore, when the scan lines G1-G3 transmit enable signals, the switch elements P1-P9 in the pixel unit 110-130 are turned on, and a data signal of the data line D1 can transmit to the switch elements P1-P6 at the moment.

In an embodiment, the pixel structure 100 further includes a plurality of data selection lines DL1-DL8. The data selection lines DL1-DL8 are disposed along the second direction R2 and between the pixel units 110-180. In the present embodiment, two data selection lines and a scan line are disposed between two adjacent pixel units that are disposed along the first direction R1. For example, the two data selection lines DL1 and DL2 and the scan line G1 are disposed between the pixel units 110 and 120. The data selection lines DL1-DL8 are configured to provide a plurality of data signals to the data lines. For example, the data selection line DL1 (e.g., a T-wire, however, the present disclosure is not limited thereto) is electrically coupled to the data line D1 to provide a data signal to the data line D1, the data selection line DL2 is electrically coupled to the data line D2 to provide a data signal to the data line D2, and the data selection line DL3 is electrically coupled to the data line D3 to provide a data signal to the data line D3.

As a result, the data selection lines DL1-DL8 disposed in the pixel structure 100 can effectively reduce wiring of the data lines D1-D3 on a periphery portion of the pixel structure 100. For example, as shown in FIG. 1, the pixel structure 100 can save wiring of the data lines D1-D3 on the periphery portion of the pixel structure 100, and the number of the wiring is two times the number of the scan lines G1-G4.

Figure 2:
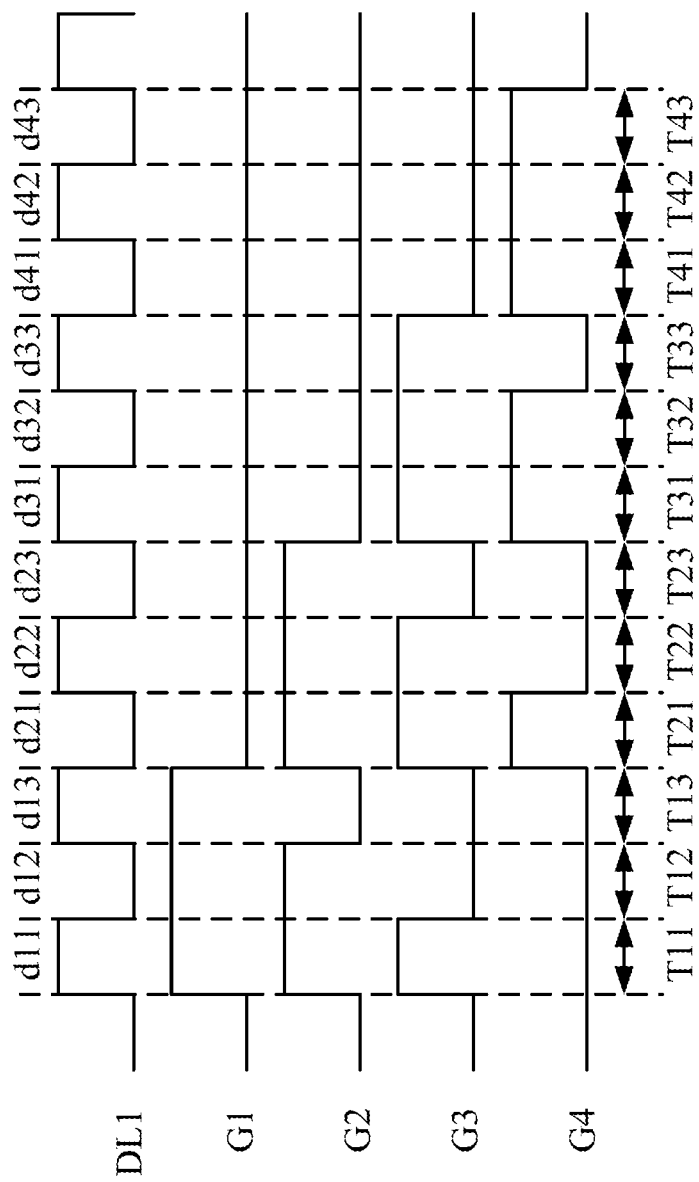
FIG. 2 is a schematic diagram of timing of driving signals according to an embodiment of the present disclosure.

In order to describe a driving method adaptable to the pixel structure 100, reference is made to FIGS. 1 and 2. In a time interval T11, the data selection line DL1 transmits a data signal d11 to the data line D1, the scan lines G1-G3 transmit the enable signals (e.g., logic high levels), therefore the switch elements P1-P9 and P13-P21 are turned on, and the other switch elements P10-P12 and P22-P24 are turned off. Therefore, the switch elements P1, P4 and P6 directly receive the data signal d11 from the data line D1, the switch element P2 receives the data signal d11 through the switch element P4, and the switch element P3 receives the data signal d11 through the switch element P5 and the switch element P6. Therefore, the switch elements P1-P6 store the data signal d11 in the coupled capacitors respectively.

Then, in a time interval T12, the data selection line DL1 transmits a data signal d12 to the data line D1, the scan lines G1-G2 transmit the enable signals, the scan line G3 transmits a disable signal (e.g., a logic low level), therefore the switch elements P1-P5, P7 and P13-P18 are turned on, and the other switch elements P6, P8-P12 and P19-P24 are turned off. Therefore, the switch elements P1 and P4 directly receive the data signal d12 from the data line D1, the switch element P2 receives the data signal d12 through the switch element P4. Therefore, the switch elements P1-P2 and P4 store the data signal d12 in the coupled capacitors respectively, and the capacitors coupled to the switch elements P3, P5 and P6 store the data signal d11.

In a time interval T13, the data selection line DL1 transmits a data signal d13 to the data line D1, the scan line G1 transmits the enable signal, the scan lines G2-G3 transmit the disable signal, therefore the switch elements P1-P3 and P13-P15 are turned on, and the other switch elements P4-P12 and P16-P24 are turned off. Therefore, the switch element P1 directly receives the data signal d13 from the data line D1. Therefore, the switch element P1 stores the data signal d13 in the coupled capacitor, the capacitors coupled to the switch elements P3, P5 and P6 store the data signal d11, and the capacitors coupled to the switch elements P2 and P4 store the data signal d12.

It should be supplemented that in the time intervals T11-T13, the data selection line DL2 can also transmit the same data signal or a different data signal to the data line D2, and operations of the switch elements P13-P17 and P19 are similar to the operations of the switch elements P1-P6, and therefore the description is not repeated herein.

As a result, the single data line D1 can respectively drive the switch elements P1-P3 of three pixels in the three time intervals T11-T13, and respectively store the data signals d11-d13 in the capacitors coupled to the switch elements P1-P3. Similarly, the single data line D2 can drive the switch elements P13-P15 of three pixels in the three time intervals T11-T13, and respectively store the data signals (not shown) in capacitors coupled to the switch elements P13-P15. Compared to the prior art, the pixel structure 100 merely requires one third of the number of the data lines (i.e., reducing number s of the data lines), and further reduces wiring area of the data lines on the periphery portion of the pixel structure 100.

In time intervals T21-T23, operations of the scan lines G2-G4 are similar to the operations of the scan lines G1-G3 in the time intervals T11-T13, and therefore the switch elements P4, P5 and P7 can store data signals d21-d23 of the data line D1 to the coupled capacitors respectively, and the other switch elements coupled to the scan line G2 can also store a data signal transmitted by a coupled data line in capacitors (e.g., the switch elements P16-P18 can respectively store a data signal of the data line D2 in the coupled capacitors in the time intervals T21-T23). As aforementioned, in time intervals T31-T33, the switch elements P6, P8 and P9 can respectively store data signals d31-d33 of the data line D1 in the coupled capacitors (operations of other switch elements coupled to the scan line G3 are similar). In time intervals T41-T43, the switch elements P10-P12 can respectively store data signals d41-d43 of the data line D1 in the coupled capacitors (operations of other switch elements coupled to the scan line G4 are similar).

In conclusion, the pixel structure 100 of the present disclosure can drive three switch elements (i.e., driving three pixels) to receive and store the data signal of the same data line by time-division-multiplexed scan, therefore effectively reduce the number of the data line in the pixel structure 100, and further achieve an effect of the data lines without wiring on the periphery portion of the pixel structure 100. Moreover, the data selection line DL1-DL8 disposed between the pixel units 110-180 can further reduce the number of the wiring on the periphery portion of the pixel structure 100. Therefore, the pixel structure 100 of the present disclosure is adaptable to a display device with a slim frame design.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pixel structure, comprising:
   a plurality of data lines, disposed along a first direction;
   a plurality of scan lines, disposed along a second direction, wherein the first direction is different from the second direction; and
   a plurality of pixel units, disposed along the first direction and the second direction;
   wherein a first pixel unit of the pixel units comprises:
   a first switch element, electrically coupled to a first scan line of the scan lines and a first data line of the data lines;
   a second switch element, electrically coupled to the first scan line; and
   a third switch element, electrically coupled to the first scan line;
   a second pixel unit of the pixel units comprises:
   a fourth switch element, electrically coupled to a second scan line of the scan lines, the first data line and the second switch element; and
   a fifth switch element, electrically coupled to the second scan line and the third switch element; and
   a third pixel unit of the pixel units comprises:
   a sixth switch element, electrically coupled to a third scan line of the scan lines, the first data line and the fifth switch element.

2. The pixel structure of claim 1, wherein in a first time interval, the first scan line, the second scan line and the third scan line transmit an enable signal, the first switch element receives a first data signal on the first data line, the second switch element receives the first data signal through the fourth switch element, and the third switch element receives the first data signal through the fifth switch element and the sixth switch element.

3. The pixel structure of claim 2, wherein in a second time interval, the first scan line and the second scan line transmit the enable signal, the third scan line transmits a disable signal, the first switch element receives a second data signal on the first data line, and the second switch element receives the second data signal through the fourth switch element.

4. The pixel structure of claim 3, wherein in a third time interval, the first scan line transmits the enable signal, the second scan line and the third scan line transmit the disable signal, and the first switch element receives a third data signal on the first data line.

5. The pixel structure of claim 1, further comprising:
   a plurality of data selection lines, disposed along the second direction and between the pixel units, wherein the data selection lines are configured to provide a plurality of data signal to the data lines.

6. The pixel structure of claim 1, wherein the first switch element, the second switch element and the third switch element are disposed along the second direction, and the fourth switch element and the fifth switch element are disposed along the second direction.

7. The pixel structure of claim 1, wherein the first switch element, the fourth switch element and the sixth switch element are disposed along the first direction, and the second switch element and the fifth switch element are disposed along the first direction.

8. A driving method, adaptable to a pixel structure, wherein the pixel structure comprises a plurality of data lines disposed along a first direction, a plurality of scan lines disposed along a second direction which is different from the first direction and a plurality of pixel units disposed along the first direction and the second direction, a first pixel unit of the pixel units comprises a first switch element, a second switch element and a third switch element, a second pixel unit of the pixel units comprises a fourth switch element and a fifth switch element, a third pixel unit of the pixel units comprises a sixth switch element, and the driving method comprises:
   in a first time interval, transmitting an enable signal by the first scan line, the second scan line and the third scan line; and in the first time interval, receiving a first data signal on a first data line of the data lines by a first switch element, receiving the first data signal through the fourth switch element by a second switch element, and receiving the first data signal through the fifth switch element and the sixth switch element by the third switch element.

9. The driving method of claim 8, further comprising:
in a second time interval, transmitting the enable signal by the first scan line and the second scan line, and transmitting a disable signal by the third scan line; and
in the second time interval, receiving a second data signal on the first data line by the first switch element, and receiving the second data signal through the fourth switch element by the second switch element.

10. The driving method of claim 9, further comprising:
in a third time interval, transmitting the enable signal by the first scan line, and transmitting the disable signal by the second scan line and the third scan line; and
in the third time interval, receiving a third data signal on the first data line by the first switch element.

\* \* \* \* \*